Jan. 5, 1943.   G. R. CUNNINGTON   2,307,201
SEAT CONSTRUCTION
Filed July 8, 1940
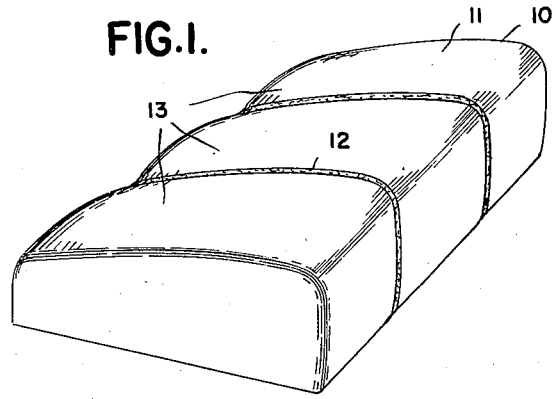
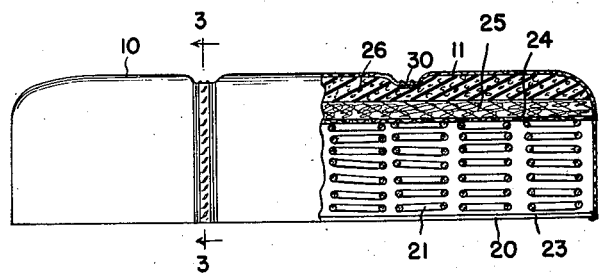
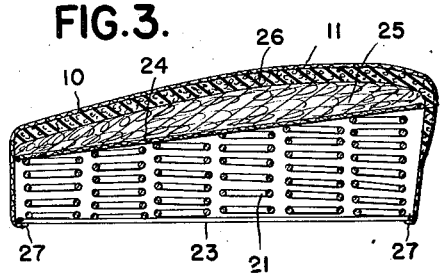
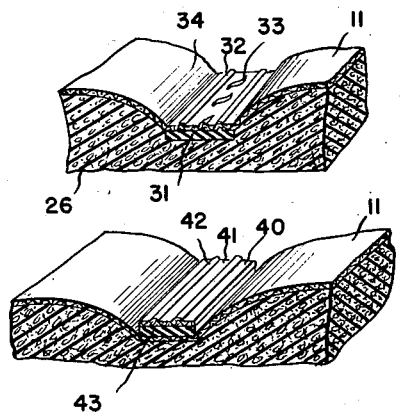
INVENTOR.
GEORGE R. CUNNINGTON
BY Whittemore, Hulbert
& Belknap ATTORNEYS Patented Jan. 5, 1943

2,307,201

UNITED STATES PATENT OFFICE 2,307,201

SEAT CONSTRUCTION

George R. Cunnington, Grosse Pointe Park, Mich., assignor to National Automotive Fibres, Inc., Detroit, Mich., a corporation of Delaware Application July 8, 1940, Serial No. 344,457

4 Claims. (Cl. 155—179)

The present invention relates to a seat construction and more particularly to an arrangement adapted to improve and enhance the appearance of vehicle seats employing the well-known foam rubber cushions.

In its broader aspects the invention may be practiced in conjunction with seats of other types, as for example ordinary seat constructions employing fibrous padding material and the like.

As is well-known, seats for vehicles employing foam rubber as a padding material are becoming increasingly popular. So far, various efforts have been made to upholster seats of this type in an attractive manner, but generally speaking seats of this type remain plain and unattractive or else much of the benefit of the foam rubber pad is lost.

According to the present invention I provide a novel type of upholstery fabric cover which is characterized by the provision of an elastic band, which may be tensioned over the foam rubber in a manner to cause the fabric to be formed downwardly into the upper surface of the foam rubber so as to give rise to an attractive pillow effect. Preferably, the band is provided as an integral part of the upholstery fabric although, as will be pointed out later, it may be applied as a separate element. As is well-known, the fabric which is employed in upholstering seats of vehicles may be somewhat stretched, and if an effort were made to obtain the same result merely by tensioning a designated band of the upholstery fabric, the effectiveness would be less and due to stretch of the fabric it would soon disappear.

With the foregoing general remarks in view, it is an object of the present invention to provide a seat construction having in combination with a yielding padding material, an upholstery fabric tensioned along narrow bands so as to provide a pillow effect.

It is a further object of the invention to provide elastic bands in combination with upholstery fabrics for seat constructions employing a yieldable padding material.

It is a further object of the invention to provide as an article of manufacture, an upholstery fabric seat cover having one or more elastic bands formed as an integral part thereof by the provision of a narrow band of rubber vulcanized to the rear surface of the fabric.

Other objects of the invention will be apparent as the description proceeds, and when taken in conjunction with the accompanying drawing, wherein:

Figure 1 is a perspective of a seat cushion made in accordance with the present invention;

Figure 2 is a front elevation of the seat cushion shown in Figure 1, with parts broken away;

Figure 3 is a section on the line 3—3, Figure 2;

Figure 4 is a detail sectional view on an enlarged scale illustrating the cooperation between the elastic band and the padding material; and Figure 5 is a detail sectional view on an enlarged scale illustrating a somewhat different embodiment of my invention.

Referring first to Figure 1, I have illustrated generally at 10 a seat cushion covered with an upholstery fabric 11 which is secured to the frame of the seat construction at the bottom thereof. The fabric 11 is forced downwardly and presses the upper surface of the underlying padding material along bands 12 so as to form intermediate and adjacent relatively elevated pillow portions 13.

Referring now to Figures 2 and 3, the seat construction comprises a frame 20 carrying a plurality of coil springs 21 and provided with a lowermost tacking strip 23. Overlying the frame 20 is ordinarily provided an insulator 24, over which is placed a ply of fibrous padding material 25 which may be cotton, jute or other material.

Overlying the padding material 25 I have illustrated at 26 a pad of foam rubber. Foam rubber of this type, as is well-known, is prepared from latex, which is first whipped into a froth and is ultimately vulcanized in substantially this frothy or foamy condition. Pads of this type are very resilient and increase the riding comfort substantially.

In the past a cover fabric, such as shown at 11 in Figure 1, was tensioned over the smooth upper surface of the rubber so that the seat cushion presented a smooth unbroken upper surface, whose severity of appearance was not in harmony with the interior trim of the vehicle. According to the present invention the upholstery fabric 11 has an elastic band 30 formed therein or associated therewith, which may be strongly tensioned over the assembly and secured in place as by tacking to the tacking strip 23 as indicated at 27.

Referring more particularly to Figure 4, the arrangement is illustrated in detail in this figure. The fabric 11 is shown as having a strong rubber band 31 vulcanized to the rear surface of the fabric 11. As illustrated in this figure, the upper surface of the cloth may be embossed in conformity with the rubber to provide design beads as 32, or other design elements as indicated at 33.

The foam rubber 26, as indicated in this figure, is compressed along the band so that the upper surface of the fabric is rounded, as well indicated at 34, giving rise to an attractive pillow effect. It will be observed by referring to Figures 1 and 2, these bands, if desired, may divide the seat construction into three zones, each of which is normally adapted to accommodate a passenger.

Much the same general effect may be obtained by employing a separate tensioning band, such as illustrated at 40 in Figure 5. In this figure the trim fabric 11 is unmodified and the pillow effect is produced by the band 40 which comprises an upper fabric strip 41 embossed, if desired, as indicated at 42, and has vulcanized thereto a strong elastic band of rubber 43. While this construction is in some respects less satisfactory than the construction illustrated in detail in Figure 4, it nevertheless comes within the broader scope of my invention.

I have found it to be desirable to employ an elastic band for tensioning the fabric to produce a pillow effect for the reason that this band throughout its life will maintain its tension. On the other hand, if a non-elastic band were employed there would be a tendency for it to elongate during service with the result that ultimately much of the pillow effect would be lost.

In the foregoing specific description I have illustrated and described my invention particularly in conjunction with foam rubber. This is for the reason that it is in this connection that the invention demonstrates its utility to the best advantage. It may, however, be practiced with other padding material, such for example as a ply of fibrous padding material directly underlying the upholstery material. Where employed with foam rubber, the result is very marked, however, due to the high degree of resiliency of the foam rubber which lends itself admirably to cooperation with the elastic band, as set forth.

The trim fabric 11 may conveniently be modified in accordance with the present invention by applying a narrow band of moderate thickness of uncured rubber to the rear surface thereof. This band will normally be less than one-eighth of an inch in thickness. In large part the thickness of the band will depend upon the quality of the rubber, keeping in mind, of course, the strength requirements of the rubber to produce the desired pillow effect. Preferably the band is decorated, as indicated in detail in Figures 4 and 5, and this may conveniently be accomplished by employing a vulcanizing press having a desired design die formation at the side thereof which engages the fabric. The unvulcanized rubber may be supported on a smooth support and heat and pressure applied. During the application of heat and pressure the rubber is deformed in conformity with the design and is simultaneously cured and vulcanized directly to the rear surface of the upholstery fabric.

The product may, if desired, be made in a continuous process, preferably in conjunction with a heated drum and forming bands which compress the fabric and rubber against the heated drum so as to form the desired decorative design, cure the rubber, and vulcanize the rubber to the fabric.

In assembling my improved upholstery seat cover in the seat construction, it is preferably tensioned strongly along the bands, the ends of which may be tacked or otherwise secured to the frame of the seat construction. As will be evident, the degree of tension employed will largely determine the effectiveness of the design. The fabric is afterward tacked or otherwise secured to the frame around all edges, sufficient tension being applied to smooth the fabric over the sponge rubber cushion, but the tension being less than sufficient to substantially compress the foam rubber.

During the life of the cushion, this condition continues without deterioration. The trim fabric may, and quite probably will, stretch during usage, but due to the elasticity of the bands 12 the pillow effect will be maintained without substantial diminution. I wish to call attention to the fact that I consider my invention to comprise the combination which makes up the improved seat construction as well as the improved upholstery cover fabric as an article of manufacture.

While I have specifically illustrated and described two embodiments of my improved seat construction, the same has been done merely to enable those skilled in the art to practice the invention, the scope of which is indicated by the appended claims.

What I claim as my invention is:

1. A seat construction comprising a frame having a tacking strip structure at its lower edges, a spring supported on said frame, a ply of yielding padding material over said spring structure, a seat cover of trim fabric having a narrow continuous band of rubber extending from front to back of said trim fabric and vulcanized to the under side thereof, said trim fabric and said rubber being embossed to form a decorative design, said cover being relatively lightly tensioned over said padding material except along the line of said band and being secured to said tacking strip, said cover being relatively strongly tensioned along said band and secured to said tacking strip at front and back of said frame.

2. A seat construction comprising a frame having a tacking strip at its lower edges, a spring structure supported on said frame, a ply of porous rubber over said spring structure, a seat cover of trim fabric having a narrow continuous band of rubber extending from front to back of said trim fabric and vulcanized to the under side thereof, said trim fabric and said rubber being embossed to form a decorative design, said cover being relatively lightly tensioned over said padding material except along the line of said band and being secured to said tacking strip, said cover being relatively strongly tensioned along said band and secured to said tacking strip at front and back of said frame.

3. A seat construction comprising a frame having a tacking strip at its lower edges, a spring structure supported on said frame, a ply of yielding padding material over said spring structure, a seat cover of trim fabric having a narrow continuous band of rubber extending from front to back of said trim fabric and vulcanized thereto, said cover being relatively lightly tensioned over said padding material except along the line of said band and being secured to said tacking strip, said cover being relatively strongly tensioned along said band and secured to said tacking strip at front and back of said frame.

4. A seat construction comprising a frame having a tacking strip at its lower edges, a spring structure supported on said frame, a ply of porous rubber over said spring structure, a seat cover of trim fabric having a narrow continuous band of rubber extending from front to back of said trim fabric and vulcanized thereto, said cover being relatively lightly tensioned over said padding material except along the line of said band and being secured to said tacking strip, said cover being relatively strongly tensioned along said band and secured to said tacking strip at front and back of said frame.

GEORGE R. CUNNINGTON.